(12) United States Patent
Cali et al.

(10) Patent No.: US 7,661,329 B2
(45) Date of Patent: Feb. 16, 2010

(54) PAWL DRIVE FOR COUPLING TORQUE BETWEEN TWO ROTATABLE ELEMENTS

(75) Inventors: Connard Cali, Dublin, CA (US); Carlos Ferreira, Santa Catarina (BR)

(73) Assignee: Conntechnical Industries, Inc., Pleasanton, CA (US)

( * ) Notice: Subject to any disclaimer, the term of this patent is extended or adjusted under 35 U.S.C. 154(b) by 583 days.

(21) Appl. No.: 11/381,458

(22) Filed: May 3, 2006

(65) Prior Publication Data

US 2006/0252556 A1   Nov. 9, 2006

Related U.S. Application Data

(60) Provisional application No. 60/678,464, filed on May 6, 2005.

(51) Int. Cl.
 *F02N 15/06*   (2006.01)
(52) U.S. Cl. .............................................. 74/6; 464/37
(58) Field of Classification Search ................ 464/1, 464/37–39; 74/6, 7 C, 7 R; 192/42, 46, 69.81
 See application file for complete search history.

(56) References Cited

U.S. PATENT DOCUMENTS

| | | | | |
|---|---|---|---|---|
| 2,959,945 A | * | 11/1960 | Hugo et al. | 464/38 |
| 3,798,977 A | * | 3/1974 | Digby | 74/6 X |
| 3,967,507 A | * | 7/1976 | Emms | 74/6 X |
| 4,058,192 A | | 11/1977 | Haigh | |
| 4,386,689 A | * | 6/1983 | Kato | 464/37 |
| 4,401,426 A | * | 8/1983 | Heidenreich | |
| 4,802,326 A | * | 2/1989 | Geisthoff | 464/37 |
| 5,042,312 A | * | 8/1991 | Giometti | 74/6 X |
| 6,089,112 A | | 7/2000 | Kelly et al. | |
| 6,112,873 A | * | 9/2000 | Prasse et al. | |
| 6,575,280 B2 | | 6/2003 | Ballew et al. | |
| 6,907,971 B2 | * | 6/2005 | Demir et al. | 192/46 X |

* cited by examiner

*Primary Examiner*—Greg Binda
(74) *Attorney, Agent, or Firm*—Alan Taboada, Esq.; Moser IP Law Group

(57) ABSTRACT

A method and apparatus for transferring torque from one rotatable element to another rotatable element using at least one pawl. The apparatus comprises a first rotatable element having at least one recess, a second rotatable element and at least one pawl coupled from the second rotatable element to the at least one recess. The method comprises coupling a first rotatable element, wherein the first rotatable element comprises at least one pawl to a second rotatable element, wherein the second rotatable element comprises at least one recess; rotating the first rotatable element; engaging the first rotatable element with the second rotatable element by adapting the at least one pawl to couple with the at least one recess; and transferring torque from the first rotatable element to the second rotatable element.

20 Claims, 6 Drawing Sheets

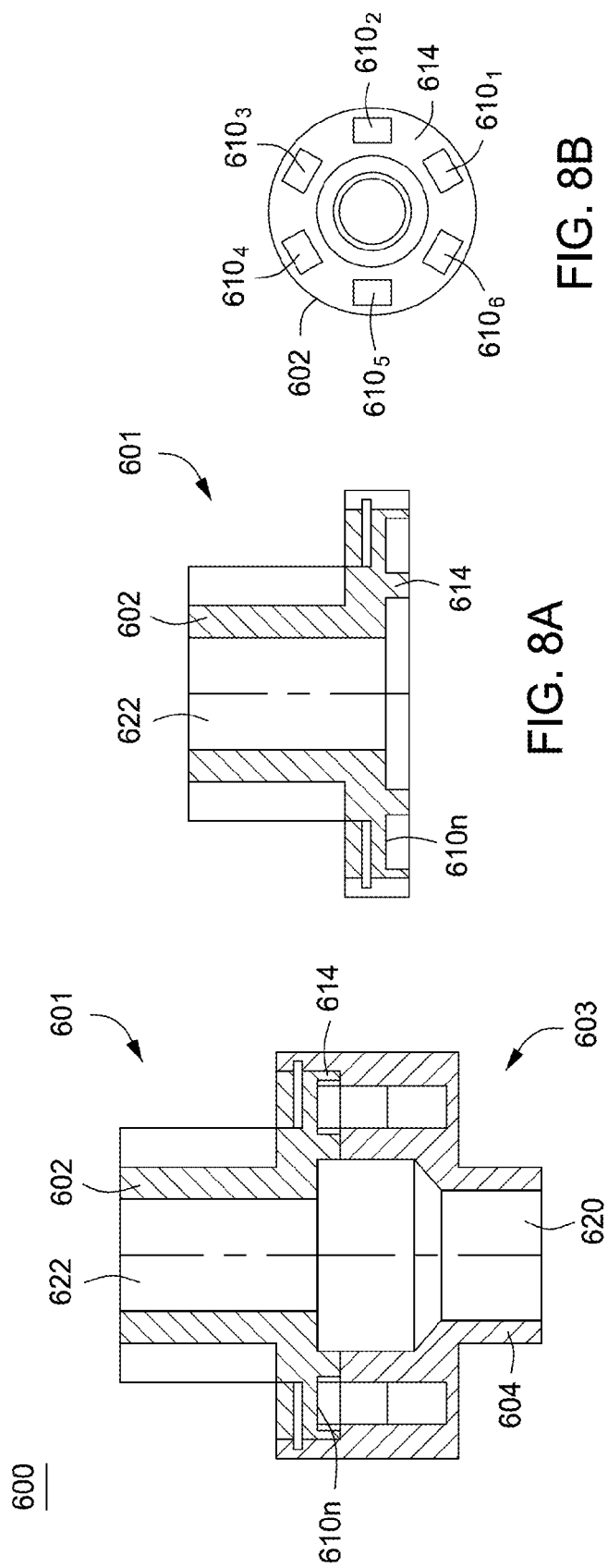

PAWL DRIVE FOR COUPLING TORQUE BETWEEN TWO ROTATABLE ELEMENTS

CROSS-REFERENCE TO RELATED APPLICATIONS

This application claims the benefit of U.S. Provisional Patent Application entitled "PAWL DRIVE FOR A STARTER MOTOR" Ser. No. 60/678,464, filed May 6, 2005, which is hereby incorporated by reference.

BACKGROUND OF THE INVENTION

1. Field of the Invention

The present invention generally relates to a drive for coupling torque from one rotatable element to another rotatable element, and more particularly, coupling the torque using a pawl.

2. Description of the Related Art

Starter motors for internal combustion engines are designed to engage a pinion gear, a first rotatable element, with a flywheel gear, a second rotatable element. When engaged and power is applied to the starter motor, the flywheel is turned to start the engine. As soon as the engine starts, the pinion gear must be decoupled from the starter motor; otherwise, the starter motor is driven by the flywheel and may be damaged. The decoupling is conventionally performed using starter motor drive including a sprag or roller clutch. A starter motor having a roller clutch is depicted in FIG. 1. The conventional starter motor comprises a hold-in winding 1, a pull-in winding 2, a return spring 3, an engaging lever 4, a meshing spring 5, a driver 6, a roller-type overrunning clutch 7, a pinion 8, an armature shaft 9, a stop ring 10, a spiral spline 11, a guide ring 12, a terminal 13, a contact 14, a contact break spring 15, a moving contact 16, a solenoid switch 17, a commutator end shield 18, a brush holder 19, a carbon brush 20, a commutator 21, a pole shoe 22, an armature 23, a field frame 24, and an excitation winding 25. The arrangement and assembly of these components is well known in the art. The starter motor drive includes the clutch 7 and pinion 8.

As shown in FIGS. 2 and 3, the sprag and roller clutches 200, 300 respectively, use a wedging action to "lock-up" the clutch. Such action causes the clutch to endure extremely high radial stresses to transmit even a moderate amount of tangential force, or useful torque. Consequently, the components of the clutch (outer race 202; 302; inner race 204, 304; roller 306 and sprag 206) must be fabricated of expensive, high quality bearing steel that is hardened to withstand the forces generated by the wedging action.

FIG. 4 depicts a perspective, sectional view of a portion of a conventional starter drive 400 comprising roller-type overrunning clutch 402 (commonly referred to as a roller clutch) and a pinion 404. FIG. 5 depicts a partial cross-sectional view of the roller clutch 402 and pinion 404. The roller clutch 402 comprises a needle bearing 406 positioned between a 1-way cam 408 and a pinion raceway 410. The clutch 402 further comprises a bushing 412 inside a bore 414 in the pinion 404, a clutch shell 416, a clutch housing 418, a roller retainer 420, a roller spring 422, a mesh spring 424 and a drive flange 426.

As the pinion 404 locks, there is an extreme radial (hoop) stress as the roller 406 is wedged against the cam 408. A special steel, exact machining and expensive heat treatment is used to ensure that the clutch 402 can withstand the stress. Additionally, the structure of the clutch and its assembly procedure is complicated. Furthermore, a clockwise and counterclockwise rotation means a different shell-to-cam orientation is needed for each direction. This requirement adds complexity and manufacturing difficulty. Similar clutches are used in other applications where torque is coupled from one rotatable element to another rotatable element.

Therefore, there is a need in the art for an improved drive for coupling torque between rotatable elements.

SUMMARY OF THE INVENTION

Embodiments of the present invention relate to a method and apparatus for transferring torque from one rotatable element to another rotatable element using at least one pawl. More specifically, one embodiment of the invention comprises a first rotatable element having at least one recess, a second rotatable element and at least one pawl coupled from the second rotatable element to the at least one recess.

In another embodiment, the invention comprises a first rotatable element, wherein the first rotatable element comprises a substantially planar face; the substantially planar face comprises at least one recess; the at least one recess comprises a first side that is substantially perpendicular to the planar face and a second side that is sloped at an oblique angle to the first side; a second rotatable element, wherein the second rotatable element comprises at least one pawl; the second rotatable element is coupled to the first rotatable element by the at least one pawl; a portion of the at least one pawl substantially matches the shape of the at least one recess; the at least one pawl is biased towards the at least one recess by a resilient member; and the at least one pawl is adapted to couple torque from the second rotatable element to the first rotatable element until the first rotatable element rotates faster than the second rotatable element.

Another embodiment of the invention is a method for coupling torque from one rotatable element to a second rotatable element. The method comprises coupling a first rotatable element, wherein the first rotatable element comprises at least one pawl to a second rotatable element, wherein the second rotatable element comprises at least one recess; rotating the first rotatable element; engaging the first rotatable element with the second rotatable element by adapting the at least one pawl to couple with the at least one recess; and transferring torque from the first rotatable element to the second rotatable element.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 7 depicts a side view of the drive of the present invention;

FIG. 8A depicts a side view of the top portion of the drive of the present invention;

FIG. 8B depicts a bottom up view of the top portion of the drive of the present invention;

Where possible, identical reference numerals are used herein to designate elements that are common to the figures. The images in the drawings are not necessarily drawn to scale and may be simplified to enhance clarity.

DETAILED DESCRIPTION

The present invention is a drive adapted to couple torque from a first rotatable member to another rotatable member. Embodiments of the present invention relate to a method and apparatus for transferring torque from one rotatable element to another rotatable element using at least one pawl. More specifically, the invention comprises a first rotatable element having at least one recess, a second rotatable element and at least one pawl coupled from the second rotatable element to the at least one recess.

Figure 1:
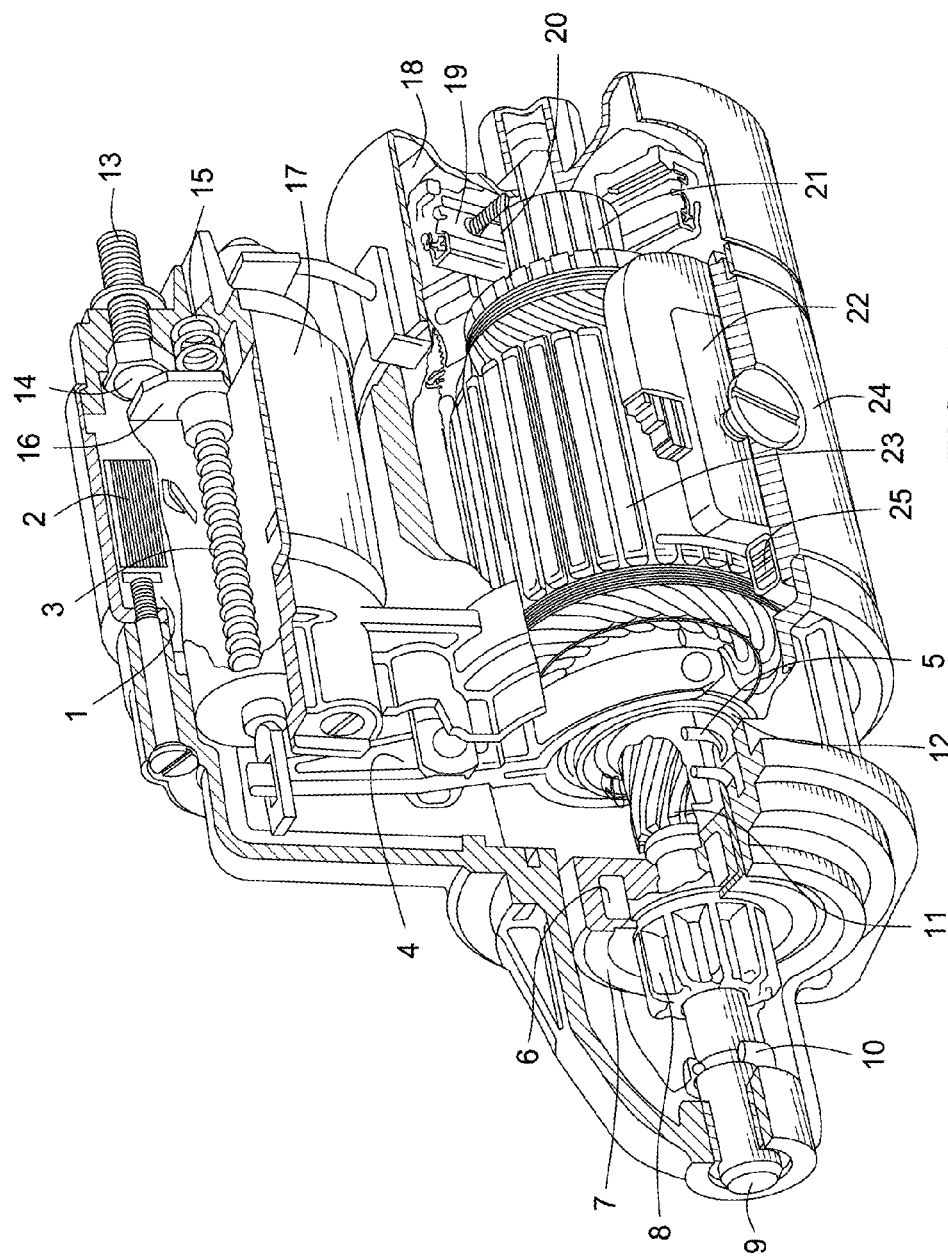
FIG. 1 is a sectional view of a conventional starter motor.
Figure 3:
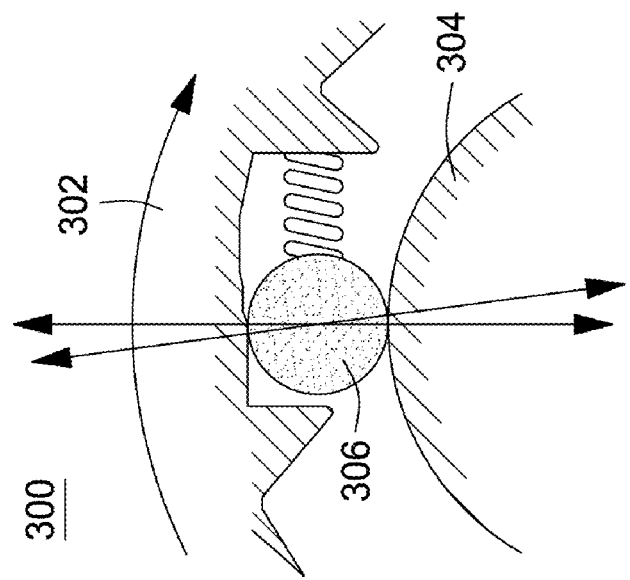
FIG. 3 is a schematic view of the operation of a conventional roller clutch.
Figure 2:
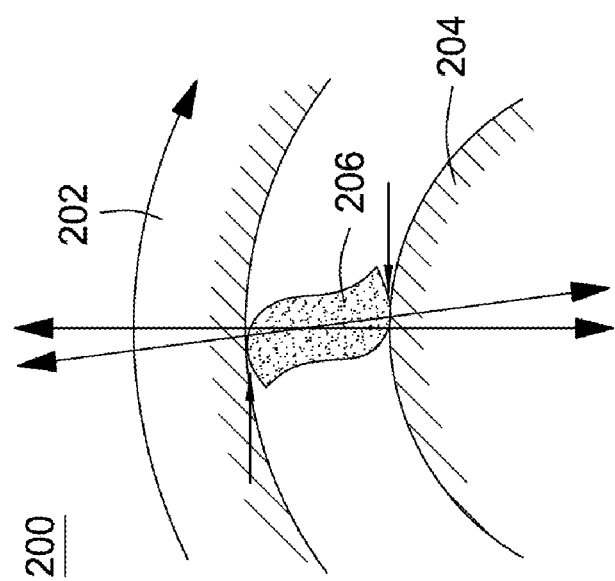
FIG. 2 is a schematic view of the operation of a conventional sprag clutch.
Figure 4:
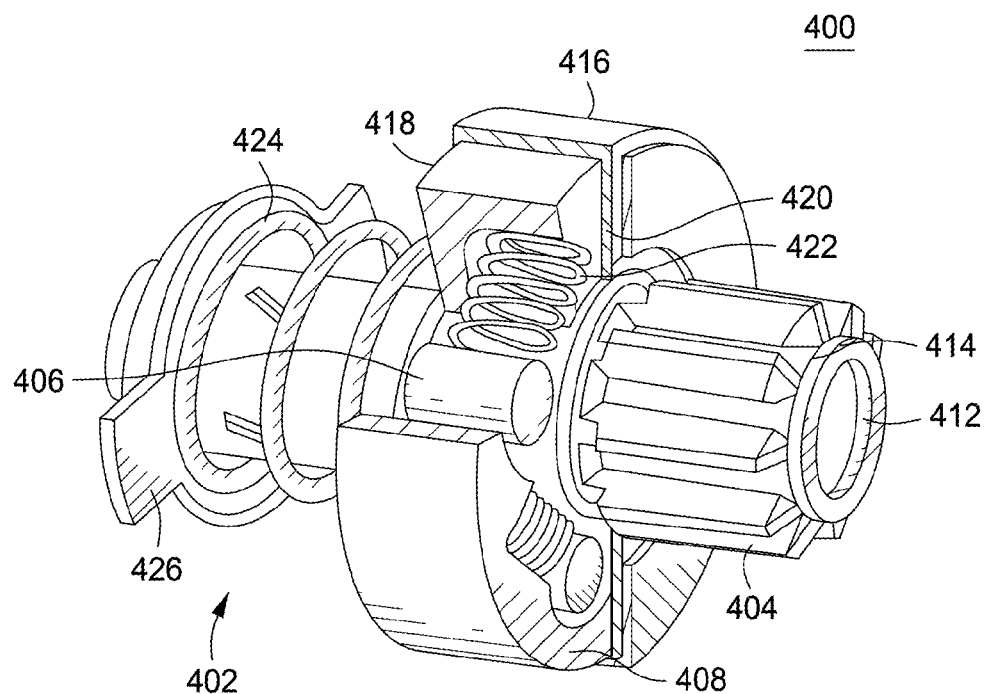
FIG. 4 depicts a perspective, sectional view of a portion of a conventional starter drive.
Figure 5:
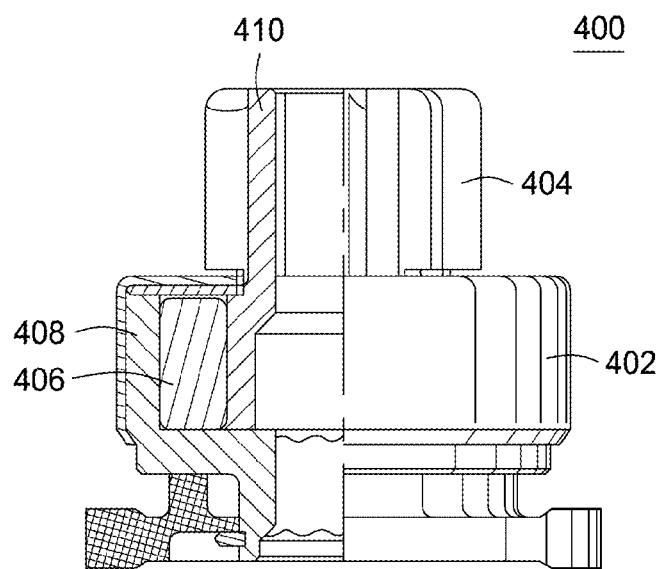
FIG. 5 depicts a sectional view of a conventional roller clutch.
Figure 6:
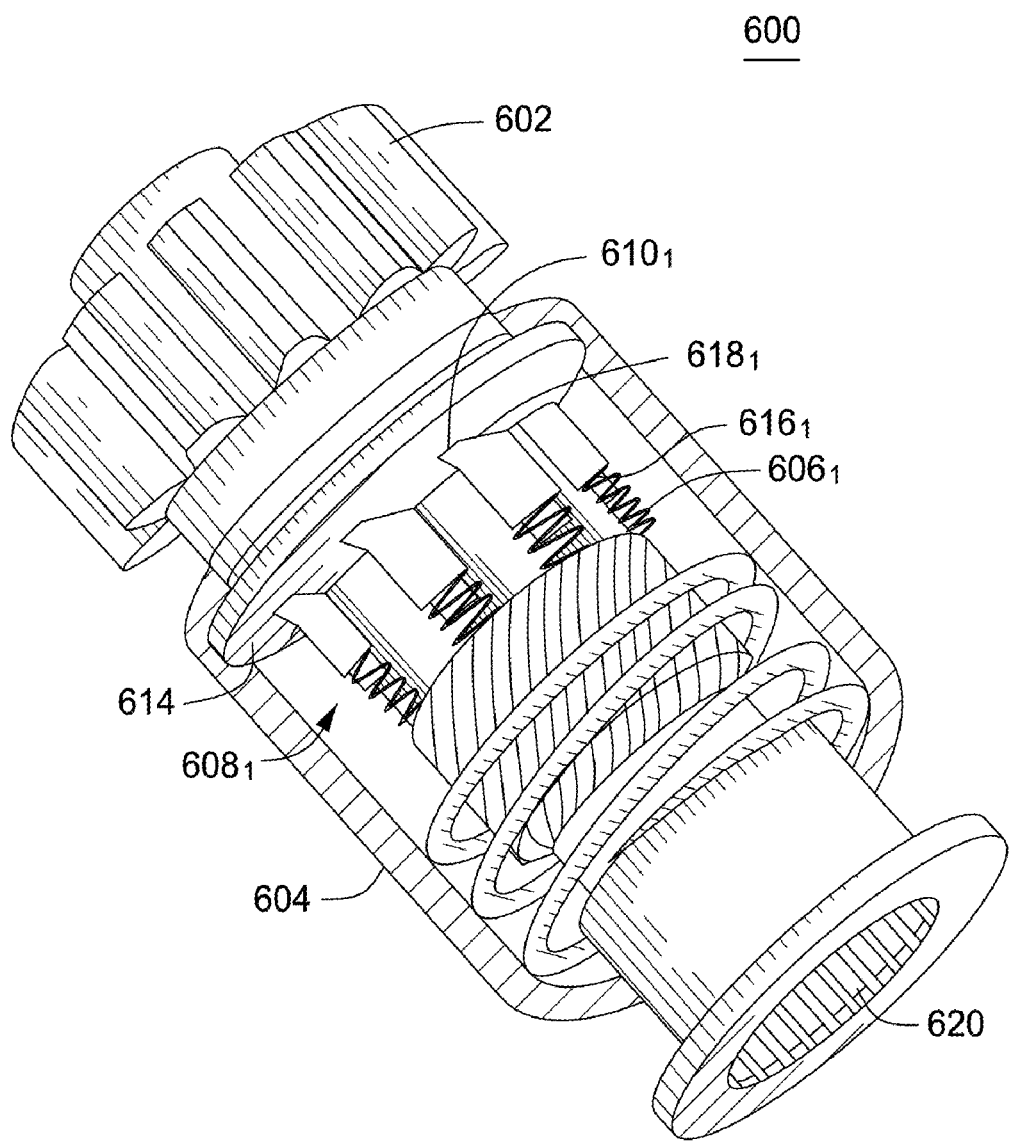
FIG. 6 depicts a perspective view of the drive of the present invention.

FIG. 6 is a cut-away perspective view of the inventive drive 600. The drive 600 comprises a pinion 602, a drive shell 604 (also referred to as an outer housing 604), a plurality of pawl springs $606n$, and a plurality of pawls $608_n$. The pinion 602 has a central bore 622 and a bottom face 614 containing equally spaced recesses $610_n$. Each recess has a saw-tooth shape, i.e., a slanted bottom surface of the recess (shown in FIG. 10). The pawls 608 are contained in slots $612_n$ in the drive shell 604. Each slot $612_n$ contains a spring $606_n$ that biases its associated pawl $608_n$ outward from the shell 604 and toward the pinion bottom face 614. Each pawl $608_n$ has a spring seat $616_n$ at one end and an angled face $618_n$ at the other end. The angle of the face $618_n$ substantially matches the angle of the saw-tooth shaped recess $610_n$. The individual pawls $608_n$ are restricted by the drive shell 604 to move in a linear fashion to engage or disengage the pinion recesses $610_n$.

Figure 9A:
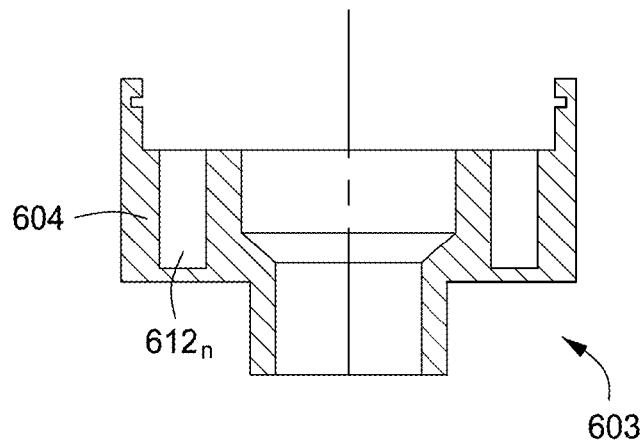
FIG. 9A depicts a side view of the bottom portion of the drive of the present invention.

FIG. 7 is a cross sectional view of the drive 600 shown FIG. 6. The drive 600 comprises a top member 601 (shown in FIG. 8A) and a bottom member 603 (shown in FIG. 9A). The bottom member 603 and the top member 601 are rotatable and coupled to each other. The bottom member 603 comprises an outer housing 604, a central bore 620 through the outer housing 604 and slots $612_n$ within the surface of the outer housing 604. The central bore 620 is adapted to be coupled to a rotatable element such as a driveshaft. The top member 601 comprises an outer housing 602, a central bore 622 through the outer housing 602, and recesses $610_n$ within the outer housing 602. Rotation of the bottom member 603 relative to the top member 601 causes the transfer of torque from the bottom member 603 to the top member 601.

Figure 9B:
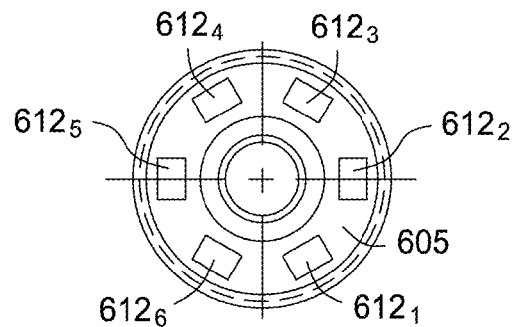
FIG. 9B depicts a bottom down view of the bottom portion of the drive of the present invention.

FIG. 9B is a top down view of the bottom rotatable element 603. The bottom rotatable element 603 has a planar surface 605 that includes a plurality of slots $612_1$ to $612_n$ (collectively 612).

FIG. 8B is a bottom up view of the top rotatable element 601. The top rotatable element 601 has a planar surface 614 that includes a plurality of recesses 6101 to $610n$ (collectively 610). In one embodiment of the invention the recesses 610 are substantially saw-toothed shaped.

Figure 10:
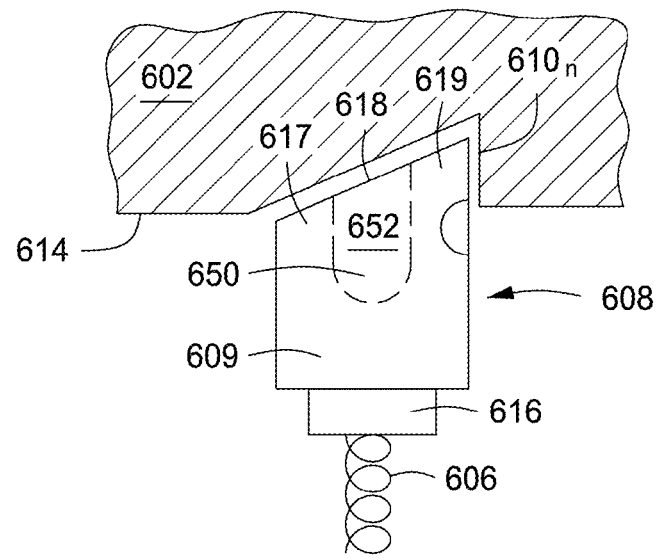
FIG. 10 depicts a pawl.

FIG. 10 is a side view of a pawl 608. The pawl 608 comprises a spring seat 616 and a pawl head 609. The pawl head 609 has a face 618 that substantially matches the recesses 610 of the top rotatable element 601. The spring seat 616 is coupled to an outwardly biased member 606. In one embodiment of the invention, the outwardly biased member 606 is a spring.

In one embodiment, the drive 600 comprises a pinion 602, a drive shell 604 (shown in FIGS. 6 and 7), a plurality of pawl springs $606_n$ (shown in FIG. 10) and a plurality of pawls $608_1$ to $608_n$ (collectively 608, shown in FIG. 10). The pinion 602 has a central bore 622 and a bottom face 614 (shown in FIGS. 8A-B) containing equally spaced recesses $610_n$ (shown in FIG. 8B). Each recess has a saw-tooth shape, i.e., a slanted bottom surface of the recess (shown in FIG. 10). As an example of the number of recesses that can be used, six recesses $610_1$ to $610_6$, that are equally spaced about a radius, are depicted. The pawls 608 (shown in FIG. 10) are contained in slots $612n$ (shown in FIG. 9B) in the drive shell 604. Each slot $612_n$ (shown in FIG. 7) contains a spring $606_n$ (shown in FIG. 10) that biases its associated pawl $608_n$ outward from the shell 604 and toward the pinion bottom face 614. Each pawl $608_n$ has a spring seat $616_n$ at one end and an angled face $618_n$ at the other end. The angle of the face $618_n$ substantially matches the angle of the saw-tooth shaped recess $610_n$. The individual pawls $608_n$ are restricted by the drive shell 604 to move in a linear fashion to engage or disengage the pinion recesses $610_n$.

Although six pawls $608_n$ and associated recesses, slots, and springs are shown, the invention may operate with as few as a single pawl or up to as many pawls as can fit in the shell 604. The number pawls and recesses control the amount of rotation of the clutch before lock-up. For example, a single pawl/recess combination would result in 359 degrees of rotation before lock up. However, using six pawl/recess combinations results in, at most, sixty degrees of rotation before lock up. Additionally, the springs 606 may be replaced with other resilient materials that may be used to bias the pawls 608 against the pinion face 614. Furthermore, a toothed bore 620 is depicted as one example of a coupling to a starter motor; other couplings such as a shaft may be used.

As the pinion 602 rotates counterclockwise, the pawls 608 fall into each pinion recess $610_n$ and lock the drive, allowing torque to be transferred from the starter motor (coupled to the drive 600 at toothed bore 620) to the pinion 602. As the pinion 602 rotates in the opposite direction (clockwise) or the pinion 602 rotates at a rate faster than the starter motor is rotating the pinion, the pawls 608 are pushed against the springs 606 allowing the pinion recesses 610 to slide past the pawls 608 in an unlocked manner.

In another embodiment of the invention, the pawl 608 comprises an angled pawl face 618, wherein the pawl face 618 comprises a first portion 617, a second portion 619 and a slot 650 (shown in phantom in FIG. 10). The slot 650 is optionally filled with a damping material capable of absorbing shock when the pawl 608 couples with the recess 610. The slot 650 extends from the face 618 to a point within the pawl 608. Each slot 650 is oriented across the face 618 to divide the face 618 into a first portion 617 and second portion 619 and aligned with a radial from the center of the pinion 602. This slot 650 enables the second portion 619 of the face 618 to be flexible and bend towards the first portion 617. The damping material 652 absorbs the initial shock of lock up. This flexibility mitigates the shock that may be transferred during lock up to other components including the starter motor or its shaft.

The inventive drive design has fewer components than conventional clutch designs and thus is easier to manufacture. Additionally, the reduced stresses on the components enable lighter and lower cost components to be used. For example, the drive shell can be fabricated from a thermoplastic.

While the foregoing is directed to embodiments of the present invention, other and further embodiments of the invention may be devised without departing from the basic scope thereof.

The invention claimed is:

1. Apparatus for coupling torque from a first rotatable element to a second rotatable element sharing an axis of rotation, comprising:
   a first rotatable element having a face that is substantially planar and perpendicularly disposed with respect to the axis of rotation and further having a plurality of recesses disposed in the face, wherein each recess comprises a first side that is substantially perpendicular to the face and an opposing second side that is sloped at an oblique angle to the first side;
   a second rotatable element having a plurality of slots; and
   a plurality of pawls, each movably disposed in a respective slot of the second rotatable element and biased towards the plurality of recesses of the first rotatable element to selectively engage therewith.

2. The apparatus of claim 1 further comprising a plurality of resilient members, each resilient member for biasing a respective pawl into one of the plurality of recesses.

3. The apparatus of claim 2 wherein each resilient member is a spring.

4. The apparatus of claim 2 wherein the second rotatable element is adapted to couple to a starter motor.

5. The apparatus of claim 1 wherein each pawl is adapted to couple torque from the first rotatable element to the second rotatable element until the first rotatable element rotates faster than the second rotatable element.

6. The apparatus of claim 1 wherein each recess has a saw-toothed shape.

7. The apparatus of claim 6 wherein a head portion of each pawl substantially matches the shape of each recess.

8. The apparatus of claim 7 wherein the head portion comprises a slot substantially aligned with a radial of the axis of rotation and configured to allow a portion of the head portion to flex.

9. The apparatus of claim 8 wherein the slot is filled with a damping material.

10. The apparatus of claim 1 wherein the first rotatable element is a pinion gear.

11. The apparatus of claim 1, wherein the at least one pawl moves along a linear path between an extended position where the at least one pawl is engaged with the at least one recess of the first rotatable element and a retracted position where the at least one pawl is not engaged with the at least one recess.

12. Apparatus for coupling torque from one rotatable element to another rotatable element sharing an axis of rotation, comprising:
   a first rotatable element having a substantially planar face that is substantially perpendicularly disposed with respect to the axis of rotation, the substantially planar face comprising a plurality of recesses, wherein each recess comprises a first side that is substantially perpendicular to the planar face and an opposing second side that is sloped at an oblique angle to the first side; and
   a second rotatable element wherein the second rotatable element comprises a plurality of pawls wherein the second rotatable element is selectively coupled to the first rotatable element by each pawl, and wherein a head portion of each pawl substantially matches the shape of each recess;
   wherein each pawl is biased towards the plurality of recesses by a respective resilient member, and wherein each pawl is adapted to couple torque from the second rotatable element to the first rotatable element until the first rotatable element rotates faster than the second rotatable element.

13. A method for coupling torque from a first rotatable element to a second rotatable element sharing an axis of rotation, comprising:
   coupling a first rotatable element wherein the first rotatable element comprises a plurality of pawls to a second rotatable element wherein the second rotatable element comprises a face that is substantially planar and perpendicularly disposed with respect to the axis of rotation and a plurality of recesses disposed in the face, each recess having a first side that is substantially perpendicular to the face and an opposing second side that is sloped at an oblique angle to the first side;
   rotating the first rotatable element;
   engaging the first rotatable element with the second rotatable element by adapting each pawl to couple with the plurality of recesses; and
   transferring torque from the first rotatable element to the second rotatable element.

14. The method of claim 13 wherein each pawl is outwardly biased by a resilient member into respective ones of the plurality of recesses.

15. The method of claim 14 wherein the resilient member is a spring.

16. The method of claim 13 wherein a head portion of each pawl substantially matches the shape of a recess of the plurality of recesses.

17. The method of claim 16 wherein the head portion each pawl comprises a slot substantially aligned with a radial of the axis of rotation such that a portion of the head portion flexes upon impact with the first side of the recess.

18. The method of claim 13 wherein the second rotatable element is a pinion gear.

19. The method of claim 13 wherein the first rotatable element is adapted to couple to a starter motor.

20. The method of claim 13 further comprising the step of disengaging the first rotatable element from the second rotatable element when the second rotatable element rotates faster than the first rotatable element.

* * * * *